United States Patent
Sinha et al.

(10) Patent No.: US 11,170,109 B2
(45) Date of Patent: Nov. 9, 2021

(54) BOOT ROM GATING CIRCUIT

(71) Applicant: NXP USA, INC., Austin, TX (US)

(72) Inventors: Rohit Kumar Sinha, Noida (IN); Arun Jain, Uttar Pradesh (IN); Himanshu Shekhar Thakur, Noida (IN); Neha Agarwal, Noida (IN)

(73) Assignee: NXP USA, INC., Austin, TX (US)

( * ) Notice: Subject to any disclaimer, the term of this patent is extended or adjusted under 35 U.S.C. 154(b) by 269 days.

(21) Appl. No.: 16/386,244

(22) Filed: Apr. 16, 2019

(65) Prior Publication Data

US 2020/0334361 A1    Oct. 22, 2020

(51) Int. Cl.
*G06F 9/4401* (2018.01)
*G06F 21/57* (2013.01)
*G06F 9/24* (2006.01)
*G06F 12/14* (2006.01)

(52) U.S. Cl.
CPC ............ *G06F 21/575* (2013.01); *G06F 9/24* (2013.01); *G06F 9/441* (2013.01); *G06F 12/14* (2013.01)

(58) Field of Classification Search
CPC .......... G06F 12/575; G06F 9/44–4418; G06F 12/14; G06F 9/24; G06F 12/85
USPC .......................................................... 713/2
See application file for complete search history.

(56) References Cited

U.S. PATENT DOCUMENTS

| | | | |
|---|---|---|---|
| 6,643,751 B2 | 11/2003 | Rosenquist et al. | |
| 6,775,778 B1 | 8/2004 | Laczko, Sr. et al. | |
| 7,117,352 B1 | 10/2006 | Giles et al. | |
| 8,914,627 B2 | 12/2014 | Park et al. | |
| 9,230,112 B1 | 1/2016 | Peterson et al. | |
| 2008/0126779 A1 | 5/2008 | Smith | |
| 2009/0063799 A1* | 3/2009 | Berenbaum | G06F 12/1441 711/163 |
| 2015/0371046 A1* | 12/2015 | Chen | G06F 21/575 713/2 |
| 2016/0092387 A1* | 3/2016 | Balasubramanian | G06F 13/4282 710/110 |
| 2017/0177870 A1 | 6/2017 | Hildebrand | |
| 2018/0075258 A1 | 3/2018 | Circello et al. | |

FOREIGN PATENT DOCUMENTS

CN           101281577          6/2010

* cited by examiner

*Primary Examiner* — Paul Yen

(57) ABSTRACT

An SoC device has a boot-code memory that stores boot code and a boot core that accesses the boot-code memory to execute the boot code at startup. The boot core is capable of executing application code after the startup is complete. One or more master cores execute application code. An access control circuit prevents the boot core from accessing the boot-code memory when application code is being executed.

8 Claims, 4 Drawing Sheets

BOOT ROM GATING CIRCUIT

BACKGROUND

The present invention relates generally to booting electronic devices and, more particularly, to techniques for preventing access to boot code stored in read-only memory (ROM) in system-on-chip (SoC) devices.

FIG. 1 is a simplified block diagram of a conventional SoC device 100 having a number of hardware (H/W) modules, including a booting core 110, an application core 120, and one or more master cores 130, that communicate via a switch fabric 140. One function of the booting core 110 is to initialize the SoC 100 at startup. To initialize the SoC, the booting core 110 accesses, via the switch fabric 140, boot code stored in ROM referred to herein as boot-code memory 150.

In a typical implementation, the boot-code memory 150 is programmed with the boot code during manufacture of the SoC 100 by the SoC producer. The code used to program the application core 120 and the master core(s) 130, which is stored external to the SoC 100 or in other SoC memory that is not represented in FIG. 1, is different from the boot-code and typically is provided to the SoC 100 after fabrication. In some implementations, the boot code contains proprietary information of the SoC producer, which the SoC producer does not want customers or users to access.

FIG. 2 is a simplified block diagram of a conventional SoC device 200 that uses a conventional technique for controlling access to the boot code stored in boot-code memory. Like the SoC device 100 of FIG. 1, the SoC device 200 includes a booting core 210, an application core 220, one or more master cores 230, a switch fabric 240, and a boot-code memory 250. In addition, the SoC device 200 has access control circuitry 260 that controls access to the boot-code memory 250 by the cores 210, 220 and 230.

The access control circuitry 260 includes logic that evaluates the logical expression (Module_ID !=Booting_Core_Module_ID), where "!=" represents the "not equal to" logical operation. In addition, the access control circuitry 260 includes gating logic 262 that receives the result of that logical expression. If the logical expression evaluates to a logic value 1, then the gating logic 262 is enabled and access to the boot-code memory 250 is blocked. Otherwise, the logical expression evaluates to a logic value 0, the gating logic 262 is disabled, and access to the boot-code memory 250 is allowed.

Each core 210, 220 and 230 is assigned a unique module ID (identification) value during manufacturing, and every transaction request generated by a core is accompanied by its identification value. The access control circuitry 260 is hard-coded with the booting core module ID value (Booting_Core_Module_ID) assigned to the booting core 210. When a core attempts to access the boot-code memory 250, the gating logic 262 receives the result of the logical expression of FIG. 2. If the access attempting core is the booting core 110, then the two values in the logical expression will be the same, the logical expression will be evaluated to a logic value 0, and the gating logic 262 will be disabled, thereby enabling access to the boot-code memory 250 by that core (i.e., the booting core 310). If the access attempting core is not the booting core 110, then the two values in the logical expression will not be the same, the logical expression will be evaluated to a logic value 1, and the gating logic 262 will be enabled, thereby preventing access to the boot-code memory 250 by that core.

In some SoC devices, after the booting core 210 has completed execution of the boot code stored in the boot-code memory 250, the booting core 210 is available to execute application code. This opens up the possibility of an SoC customer writing application code to be executed by the booting core 210 that accesses the boot-code memory 250, thereby enabling the SoC customer to read the chip manufacturer's propriety information.

One way to prevent this from happening is for the boot code itself to cause the booting core 210 to disable subsequent access to the boot-code memory 250 by any module or core including the booting core 210. One problem with this solution is that the booting core 210 needs to continue to access the boot-code memory 250 until execution of the boot code is complete. Since the booting core 210 is executing from the boot-code memory 250, if one of the instruction/set of instructions results in blocked access to the boot-code memory 250, then the next instruction fetch access of the booting core 210 will still be on the boot-code memory 250 (PC would just be incremented). Since access to boot-code memory 250 is disabled, the booting core 210 will receive an error response for the instruction fetch transaction.

One way to address this problem is for the booting core 210 to copy the portion of the boot code required to RAM, disable boot-memory access, and then begin executing from the RAM (not shown in FIG. 2). In that case, as part of the execution of the boot code stored in the RAM, the booting core 210 can disable subsequent access to the boot-code memory 250. Unfortunately, the boot code in the RAM could itself be hacked to prevent the booting core 210 from preventing or disabling access to the boot-code memory 250, thereby leaving the boot-code memory 250 accessible when the booting core 210 subsequently runs customer application code.

Accordingly, it would be desirable to have a method or circuit to prevent access to the boot-code memory after startup.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale. For example, the thicknesses of layers and regions may be exaggerated for clarity.

DETAILED DESCRIPTION

Detailed illustrative embodiments of the present invention are disclosed herein. However, specific structural and functional details disclosed herein are merely representative for purposes of describing example embodiments of the present invention. Embodiments of the present invention may be embodied in many alternative forms and should not be construed as limited to only the embodiments set forth herein. Further, the terminology used herein is for the purpose of describing particular embodiments only and is not intended to be limiting of example embodiments of the invention.

As used herein, the singular forms "a", "an", and "the", are intended to include the plural forms as well, unless the context clearly indicates otherwise. It further will be understood that the terms "comprises", "comprising", "has", "having", "includes", or "including" specify the presence of stated features, steps, or components, but do not preclude the presence or addition of one or more other features, steps, or components. It also should be noted that, in some alternative implementations, the functions/acts noted might occur out of the order noted in the figures. For example, two figures shown in succession may in fact be executed substantially concurrently or may sometimes be executed in the reverse order, depending upon the functionality/acts involved. The term "or" is to be interpreted as inclusive unless indicated otherwise.

According to certain embodiments of the present invention, an electronic device, such as an SoC device, comprises a boot-code memory that stores boot code; a plurality of hardware modules including (i) a boot core that accesses the boot-code memory to execute the boot code at startup of the electronic device, where the boot core is capable of executing application code after the startup is complete, and (ii) one or more master cores that execute application code; and an access control circuit that prevents the booting core from accessing the boot-code memory when executing application code.

Figure 1:
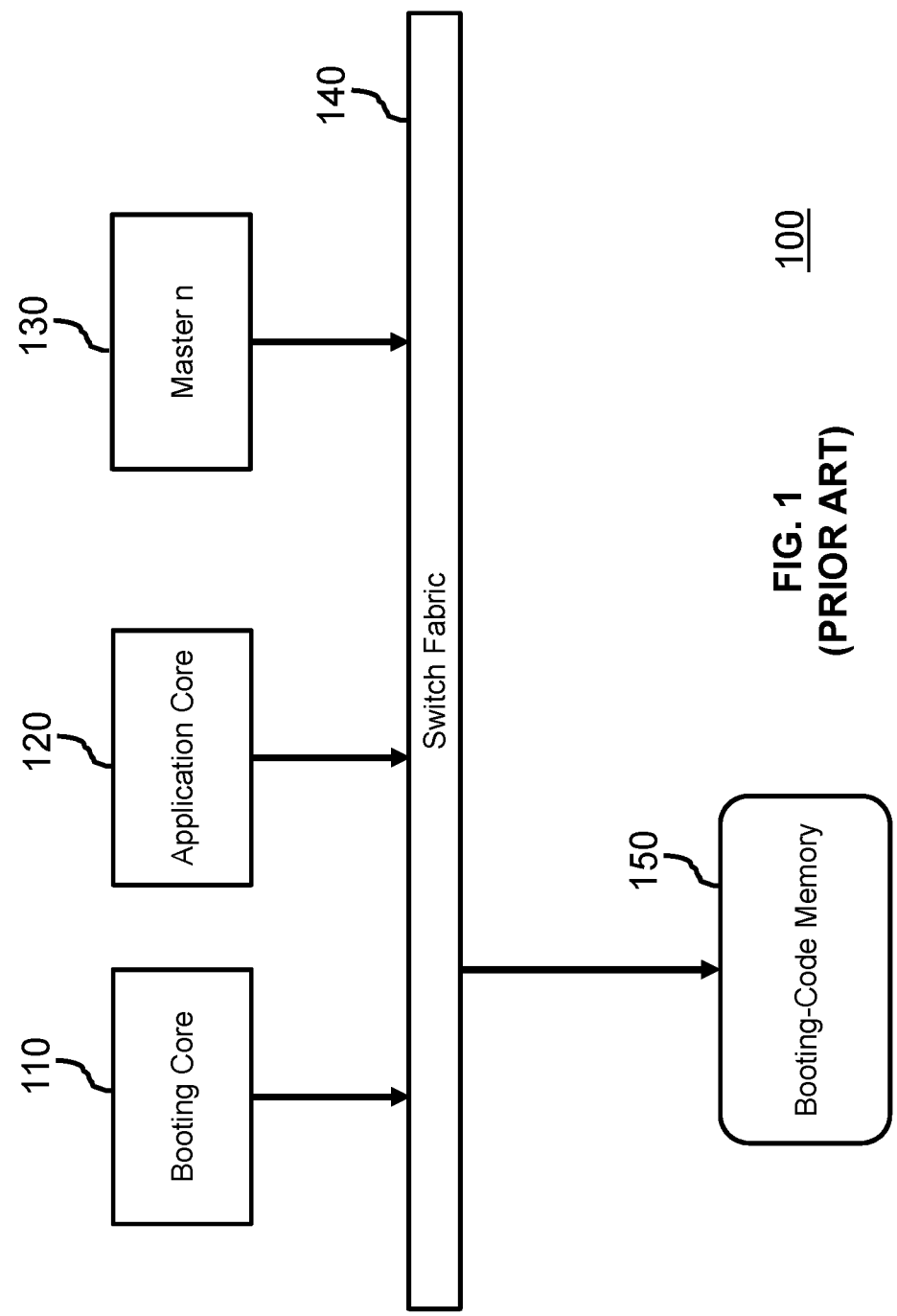
FIG. 1 is a simplified block diagram of a conventional SoC device.
Figure 2:
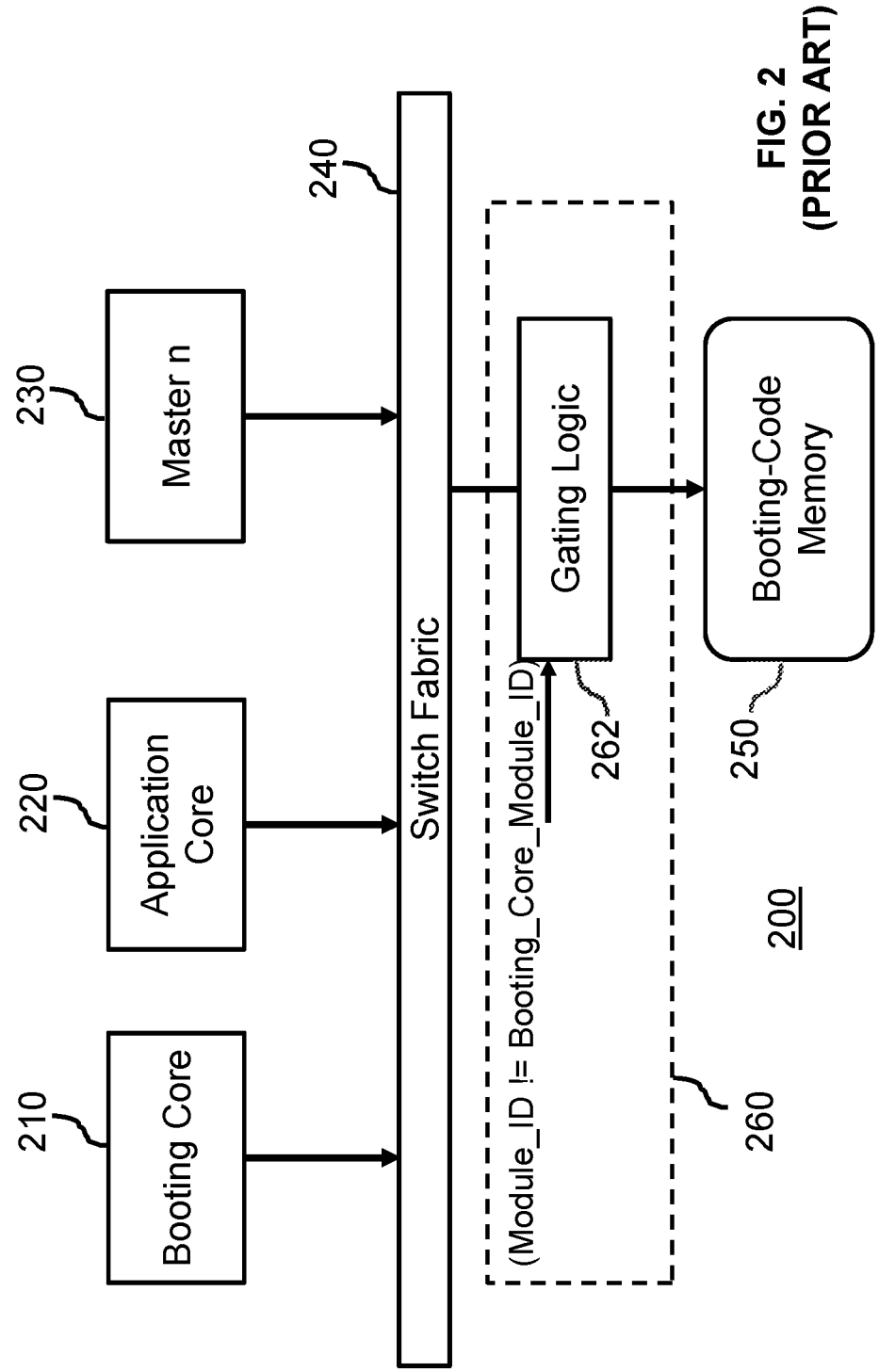
FIG. 2 is a simplified block diagram of a conventional SoC device that uses a conventional technique for controlling access to the boot code stored in boot-code memory.
Figure 3:
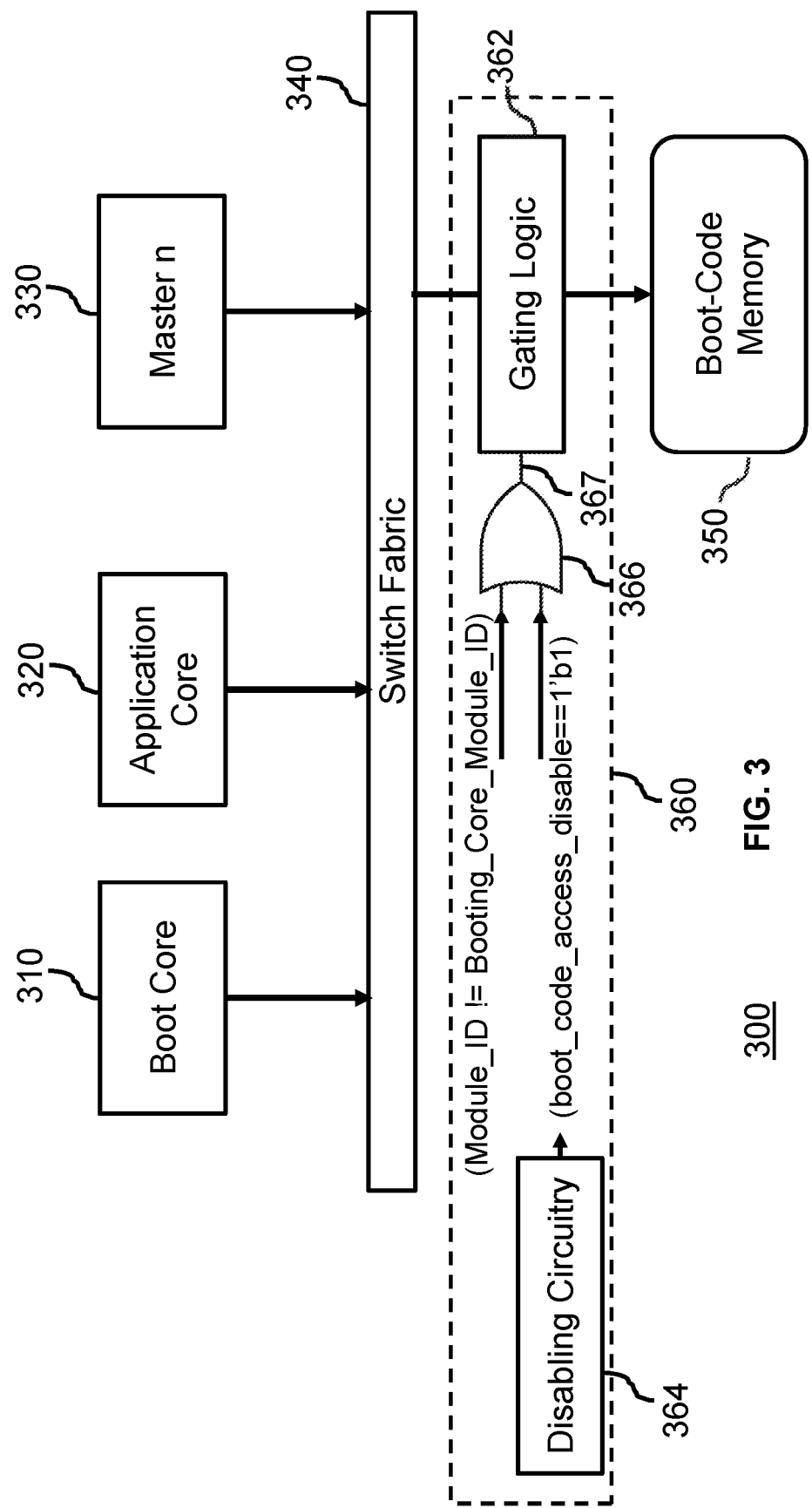
FIG. 3 is a simplified block diagram of an SoC device that uses a technique for controlling access to boot code stored in boot-code memory, according to one embodiment of the invention.

Referring now to FIG. 3, a simplified block diagram of an SoC device 300 that includes a circuit for controlling access to boot code stored in boot-code memory, according to one embodiment of the present invention, is shown. Like the SoC device 200 of FIG. 2, the SoC device 300 includes a boot core 310, an application core 320, one or more master cores 330, switch fabric 340, boot-code memory 350, and an access control circuit 360.

The access control circuit 360 includes (i) gating logic 362 that evaluates the first logical expression (Module_ID !=Booting_Core_Module_ID), (ii) disabling circuitry 364 that generates the value of a one-bit parameter booting_code_access_disable (as described in further detail below in the context of FIG. 4), (iii) logic that evaluates a second logical expression (booting_code_access_disable== 1'b1), where "==" represents the "equal to" logical operation and 1'b1 represents a bit value of 1, and (iv) OR gate 366.

The OR gate 366 receives the results of the first and second logical expressions. If either (or both) of those two logical expressions is true, then the gating enable signal 367 from the OR gate 366 will be high (i.e., logic value 1) and the gating logic 362 will be enabled, thereby blocking access to the boot-code memory 350 by an attempting H/W module (note the cores 310, 320 and 330 may be attempting H/W modules). Only when both logical expressions are false will the gating enable signal 367 be low (i.e., logic value 0) such that the gating logic 362 will be disabled and the attempting H/W module (i.e., the booting core 310) will be able to access the boot-code memory 350.

Figure 4:
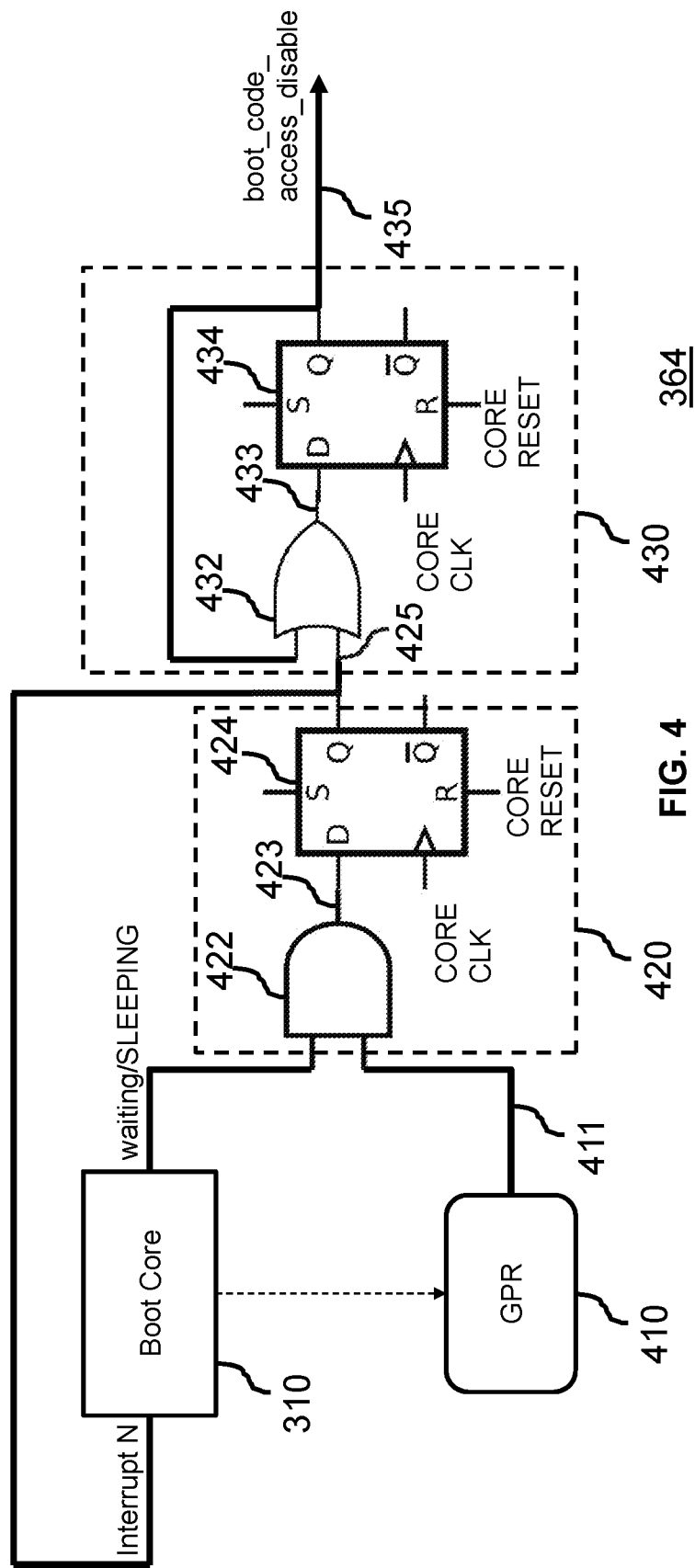
FIG. 4 is a schematic block diagram of the disabling circuitry of FIG. 3 that generates a value for the parameter booting_code_access_disable, according to embodiment of the invention.

FIG. 4 is a schematic block diagram of the disabling circuitry 364 of FIG. 3 that generates a value for the parameter booting_code_access_disable, according to one embodiment of the present invention. Those skilled in the art will understand that there are other ways of setting booting_code_access_disable.

According to the embodiment of FIG. 4, when the SoC 300 of FIG. 3 is turned on, the disabling circuitry 364 will initially generate a logic value 0 for the booting_code_access_disable parameter. In that case, referring again to FIG. 3, when the boot core 310 attempts to access the boot-code memory 350 at startup, the access control circuit 360 will evaluate both logical expressions of FIG. 3 to have logic value 0, the gating enable signal 367 from the OR gate 366 will be low, and the gating logic 362 will be disabled, thereby allowing the boot core 310 to access the boot code in the boot-code memory 350 at startup (i.e., the initial configuration and housekeeping operations performed by boot code for clocking, BIST, booting modes, etc.).

During startup, the boot core 310 accesses the boot-code memory 350 to execute the boot code (without copying the boot code into RAM). At the very end of the execution of the boot code, after the boot core 310 has received any and all of its expected responses from other H/W modules, the boot code directs the boot core 310 to perform two functions: (i) the boot core 310 stores a logic value 1 into a general purpose register (GPR) 410 that is accessible only by the boot core 310 and (ii) the boot core 310 then places itself into a sleep state while setting the one-bit parameter waiting/SLEEPING to logic value 1 after all the pending transactions are complete. Note that there is logic that restricts access to the GPR that is similar to the conventional logic of FIG. 2 based on module IDs. Additionally, the reset value of the GPR is set to zero.

The parameter waiting/SLEEPING and the GPR value 411 are applied to AND gate 422 of logic circuitry 420, which also includes flip-flop (FF) 424. At this time, both values will be high, and the output 423 of the AND gate 422, which is applied to the D input port of the flip-flop 424, will also be high. At the next core clock cycle, the flip-flop 424 will present the logic value 1 at its Q output port as the delayed FF output signal 425, which is both (i) applied to the sticky register 430 and (ii) fed back to the booting core 310.

The sticky register 430 includes OR gate 432 and flip-flop 434, where the FF output signal 435 (i.e., the parameter booting_code_access_disable) is fed back to the OR gate 432. At this time, with booting_code_access_disable low and the delayed FF output signal 425 from the logic circuitry 420 high, the output 433 of the OR gate 432, which is applied to the D input port of the flip-flop 434, will be high. At the next core clock cycle, the flip-flop 434 will present the logic value 1 at its Q output port as the FF output signal 435, thereby driving booting_code_access_disable high.

Since the FF output signal 435 is now high, for subsequent core clock cycles, the FF output signal 435 (and therefore booting_code_access_disable) will remain high, independent of the value of the delayed FF output signal 425 from the flip-flop 424.

As mentioned before, the delayed FF output signal 425 is also fed back to the boot core 310. In particular, the delayed FF output signal 425 is applied as an interrupt signal to a specific interrupt (labeled "Interrupt N" in FIG. 4) of the boot core 310 that is specifically designed to reset the value of waiting/SLEEPING to logic value 0 and take the boot core 310 out of its sleep state in order to enable the boot core 310 to be subsequently used to execute customer application code. In that case, the output 423 of the AND gate 422 will be low and, at the next core clock cycle, the delayed FF output signal 425 will be driven low, thereby de-asserting Interrupt N of the boot core 310. In some implementations, Interrupt N resets the GPR 410 and directs the boot core 310 to a specific SRAM address to begin execution of customer application code.

Typically, a core is taken out of its sleep state through an external intervention. In this case, however, the boot core 310 is taken out of its sleep state without any external intervention required.

Referring again to FIG. 3, with booting_code_access_disable now high, the access control circuit 360 will evaluate the second logical expression to be logic value 1, and the gating enable signal 367 from the OR gate 366 will be high, independent of the result of the first logical expression of FIG. 3. As such, the gating logic 362 will be enabled, and none of the cores, including the boot core 310, will be able to access the boot-code memory 350 (at least, not until a hardware reset is performed on the SoC 300).

Thus, for the SoC 300, only the boot core 310 is able to access the boot code stored in the boot-code memory 350 and only during startup. After execution of the boot code is complete, no H/W module (including the boot core 310) is able to access the boot-code memory 350. As a result, the boot core 310 can subsequently be used to execute customer application code without any risk of unauthorized access to the boot-code memory 350.

Although the invention has been described in the context of an SoC device, those skilled in the art will understand that the invention can also be implemented in the context of other types of electronic devices that have a hardware module that executes proprietary boot code at device startup.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. An electronic device, comprising:
a boot-code memory that stores boot code;
a plurality of hardware modules including:
 a boot core that accesses the boot-code memory to execute the boot code at startup of the electronic device, wherein the boot core is capable of executing application code after the startup is complete; and
 one or more master cores that execute application code; and
an access control circuit that prevents the boot core from accessing the boot-code memory when the boot core is executing application code;
wherein:
 the access control circuit comprises a general purpose register (GPR), logic circuitry, a sticky register, and gating logic;
 the boot code causes the boot core to (i) set the GPR value and (ii) place the boot core into a sleep state at the end of the startup;
 the GPR value and a sleep-state parameter are applied to the logic circuitry, which generates a delayed, logic output signal that is (i) applied to the sticky register and (ii) fed back to the boot core to remove the boot core from the sleep state;
 the sticky register generates a boot disable parameter based on the delayed, logic output signal; and
 when one of the hardware modules attempts to access the boot-code memory, the gating logic determines whether to allow said access based on at least the boot disable parameter.

2. The electronic device of claim 1, wherein the access control circuit enables the boot core to access the boot-code memory at startup, and prevents the boot core from accessing the boot-code memory after startup.

3. The device of claim 1, wherein the boot core executes the boot code directly from the boot-code memory without copying the boot code into another memory.

4. The device of claim 1, wherein the device is a system on chip (SOC) device.

5. The device of claim 1, wherein the access control circuit prevents each of the one or more hardware modules from accessing the boot-code memory at any time.

6. The device of claim 5, wherein each of the boot core and each hardware module is assigned a unique module ID value, and when one of the hardware modules attempts to access the bootcode memory, the access control circuit compares the module ID value of the one hardware module with the module ID value of the boot core to determine whether to allow the one hardware module to access the boot-code memory.

7. The device of claim 1, wherein the boot core is removed from the sleep state without any external intervention.

8. The device of claim 1, wherein:
the logic circuitry comprises:
 an AND gate that receives the GPR value and the sleep-state parameter; and
 a first flip-flop that receives an output of the AND gate and generates the delayed, logic output signal; and
the sticky register comprises:
 an OR gate that receives the delayed, logic output signal; and
 a second flip-flop that receives an output of the OR gate, generates the boot disable parameter, and feeds the boot disable parameter back to the OR gate.

\* \* \* \* \*